United States Patent [19]

Klotz

[11] 4,155,520
[45] May 22, 1979

[54] INTERMITTENT DRIVE FOR SPINNING REEL

[76] Inventor: Alden W. Klotz, 131 Dover La., Boise, Id. 83705

[21] Appl. No.: 855,949

[22] Filed: Nov. 30, 1977

[51] Int. Cl.² ............................................. A01K 89/01
[52] U.S. Cl. ...................................... 242/215; 74/393; 74/435
[58] Field of Search .......................... 242/215, 84.2 R; 74/393, 435, 437

[56] References Cited

U.S. PATENT DOCUMENTS

| 2,898,775 | 8/1959 | Reid | 74/393 X |
| 3,408,021 | 10/1968 | Nichols | 242/215 |
| 3,771,746 | 11/1973 | Griste | 242/215 |

Primary Examiner—Billy S. Taylor
Attorney, Agent, or Firm—Littlepage, Quaintance, Murphy, Richardson and Webner

[57] ABSTRACT

Alternatively usable gear trains provide either a steady or an intermittent drive for a sinning reel. In intermittent drive condition, the gear train provides "stop and go" motions of different duration, and different "stop and go" patterns are obtained through alternatively usable gear trains.

4 Claims, 8 Drawing Figures

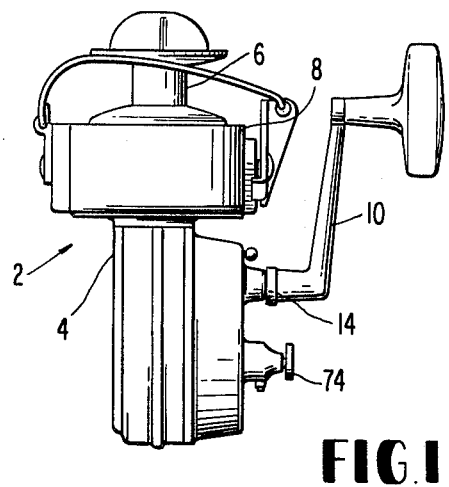
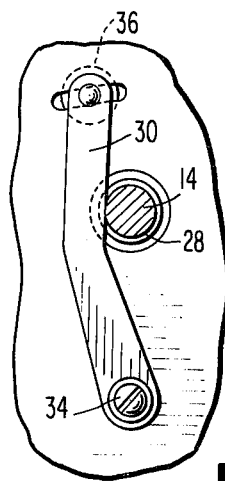
FIG.1
FIG.5
FIG.2
FIG.3
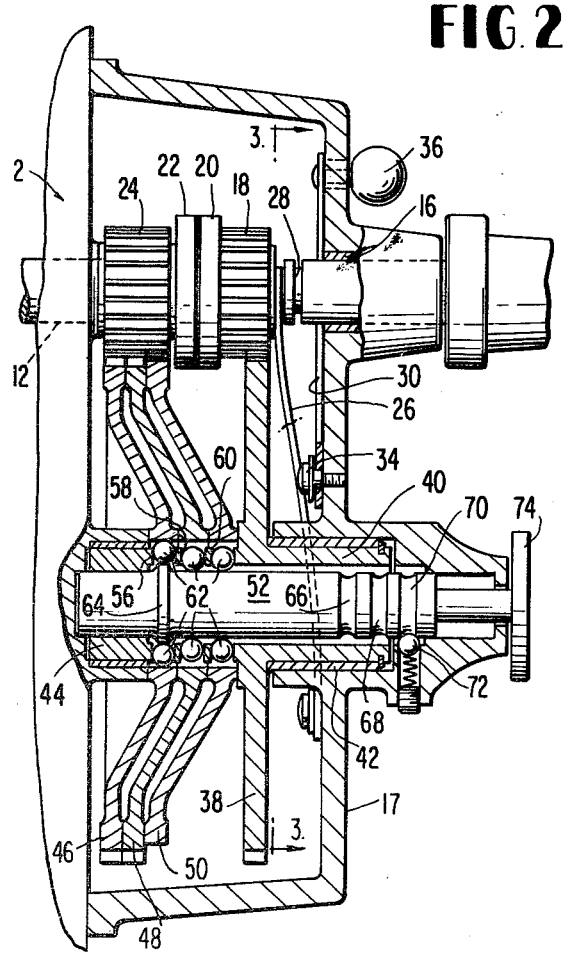
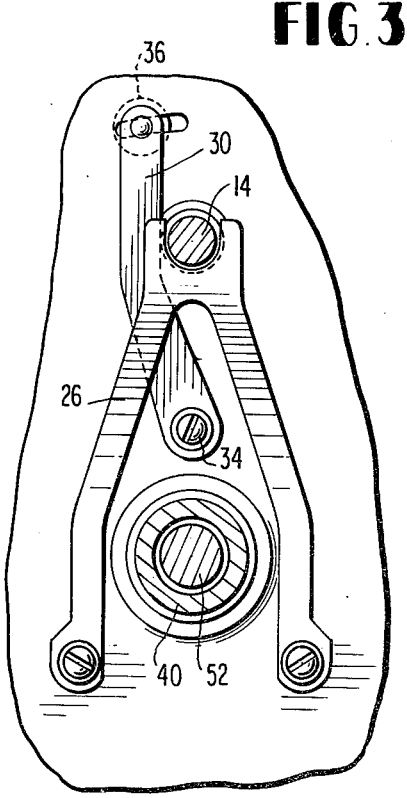

INTERMITTENT DRIVE FOR SPINNING REEL

FIELD OF INVENTION

Winding and Reeling, Spinning Reels, With Modifiable Drive, Plural, one being a variable or an on-off drive.

OBJECTS

When spin casting, a successful fisherman oftentimes gives the spinner or other type of lure an intermittent motion as he retrieves it, usually by winding in the line with an uneven motion, or by applying a slightly jerky motion to the rod tip, or both. While this can be very effective, it is quite difficult to produce a sustained series of "stop and go" motions, and to achieve a series of complete "stops" between the "goes". The primary object of this invention is to provide a drive gear for a spinning reel which will provide complete and definite "stop and go" motions during line retrieval.

While the "stop and go" motion is most effective for attracting a fish, once it is hooked the line should be retrieved with a steady motion, because during "stops" the fish would have opportunities to throw the hook out of its mouth, and each "start" would tend to tear loose the hook, particularly if it were not well set. Therefore, an equally primary object is to provide alternately usable drive trains, one providing a "stop and go" motion and the other a steady motion, and a means for easily and quickly shifting from one motion to the other.

Still another object is to provide, in the "stop and go" gear drive train, for the use of different gears which will provide for various phasing of the "stops" relative to "goes", for example, one long "stop", then a short "go", then a short "stop", and then a long "go", etc. By trying out different phase patterns, the fisherman can determine which is the most provocative for the particular kind of fish he would like to catch.

These and other objects will be apparent from the following specifications and drawings, in which:

FIG. 1 is an elevational view of a spinning reel incorporating the invention;

FIG. 2 is an enlarged fragmentary view of the reel shown in FIG. 1, broken away to show the drive in steady drive condition;

FIG. 3 is a fragmentary sectional view along the line 3—3 of FIG. 2;

FIG. 5 is a fragmentary cross section along the line 5—5 of FIG. 4 but showing the plunger in position to clutch the left-hand mutilated gear.

Figure 4:
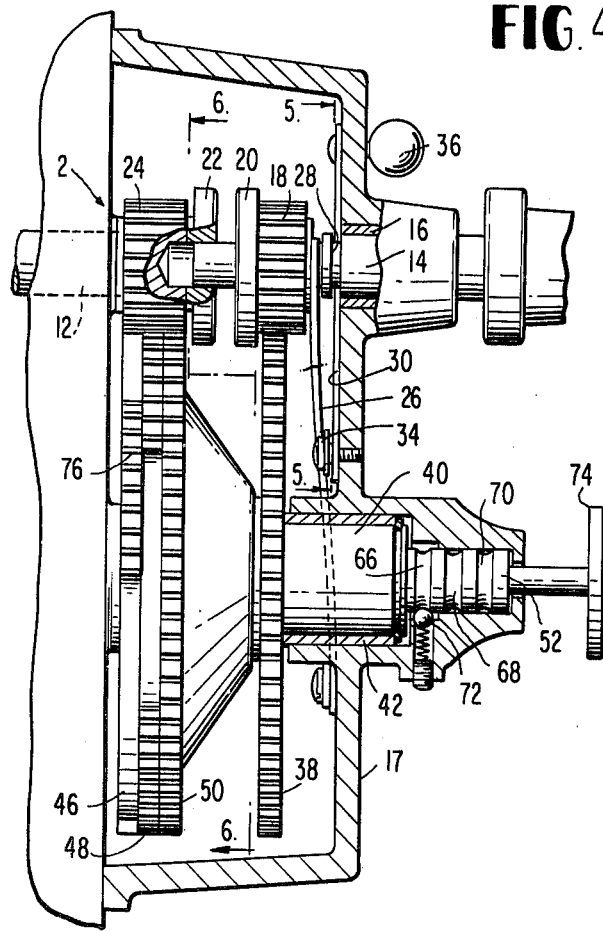
FIG. 4 is a view similar to FIG. 2, but showing the drive in intermittent condition.

Referring now to the drawings, in which like reference numerals denote similar elements, the spinning reel 2 has a casing 4 containing a conventional drive (not shown) for a spool 6 and drum 8. The elements thus far generally described are representative of several different types, enclosed or open, or where a bail or a finger is mounted on a rotating shell and the spool reciprocates, etc. They all have the common characteristic that they are manually operated by a crank 10 and the reel and drum mechanisms are driven by a reel drive shaft 12. The invention is concerned with the gearing between crank shaft 14 and the drive shaft 12.

Crank shaft 14 is rotatably and reciprocatably mounted in a bearing 16 in a plate 17 and has affixed thereon a pinion 18 having a clutch face 20 on one side thereof. Clutch face 20 is drivingly engagable with a facing clutch face 22 on one side of a pinion 24 affixed on reel drive shaft 12. The clutching motion effected by the clutch faces may be either a friction drive or, as shown, a magnetic drive, which drive occurs when the clutch faces are against one another and a non-driving relation prevails when the clutch faces are separate from one another. The clutch faces are normally held in engagement by a spring 26 which engages against pinion 18 so as to force it and the crank shaft 14 upon which it is mounted towards pinion 24.

Crank shaft 14 can be releasably retained so that the clutch faces 20 and 22 are disengaged by means of a groove 28 around the crank shaft, and into which a latch arm 30 engages. Latch arm 30 is pivoted to plate 17 as at 34. However, upon swinging a finger piece 36 on the end of latch arm 30, the crank shaft 14 is released so that the spring 26 can force crank shaft 14 inwardly and thereby force the clutch faces 20 and 22 on pinions 18 and 24 together.

Pinion 18 constantly engages a gear 38 affixed on a shaft 40, one end of which is mounted in a bearing 42 in plate 17 and the other end of which is mounted in a bearing 44 in one side of casing 4.

As illustrated, there are three mutilated gears 46, 48, and 50, rotatably mounted on shaft 40, which gears can be selectively clutched so as to rotate with shaft 40 by means of a plunger 52. The inner peripheries of the mutilated gears are formed with half-round sockets 54 and shaft 40 has three opposed pairs of ports 56, 58, and 60, which hold balls 62. Ordinarily, the balls are free to move inwardly in which position they do not engage in the sockets and in that condition the outwardly adjacent mutilated gear can freewheel around shaft 40. However, when a pair of balls is moved outwardly, they engage in the sockets in the outwardly adjacent mutilated gear and that gear is then clutched to shaft 40.

On plunger 52 is a boss 64. By sliding plunger 52 inwardly and outwardly, a selected pair of balls can be made to engage into the pockets in the selected mutilated gear and that gear is thereby clutched to shaft 40.

Plunger 52 is provided with three grooves 66, 68, and 70, into a selected one of which a spring pressed ball detent 72 snaps. The operator can select any one of the three mutilated gears by grasping knob 74 and snapping the plunger from position to position.

Figure 6:
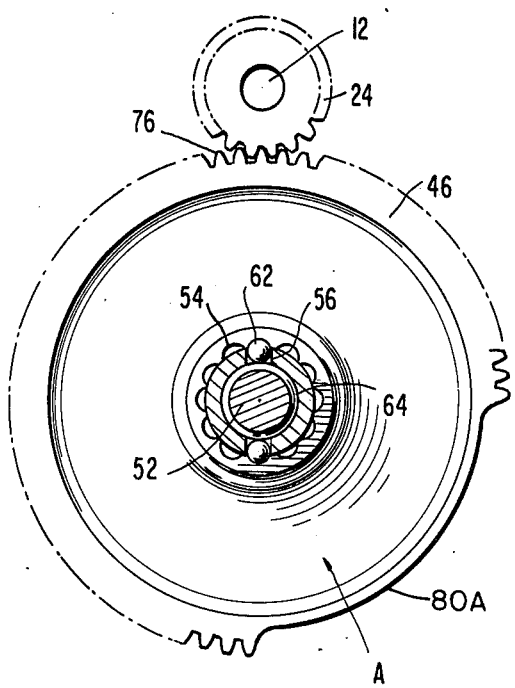
FIGS. 6, 7, and 8 show the alternately usable mutilated gears.
Figure 7:
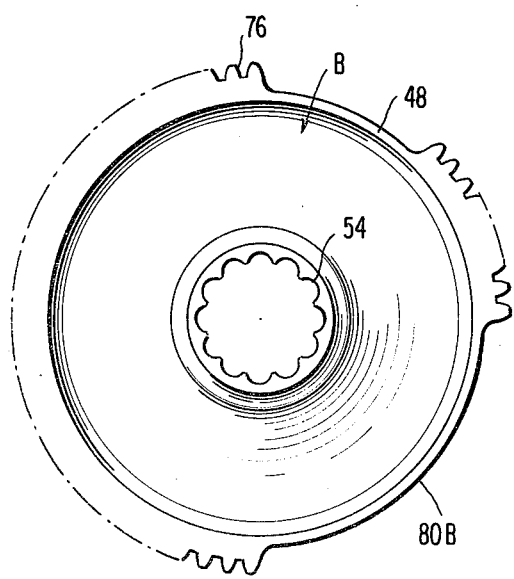
Figure 8:
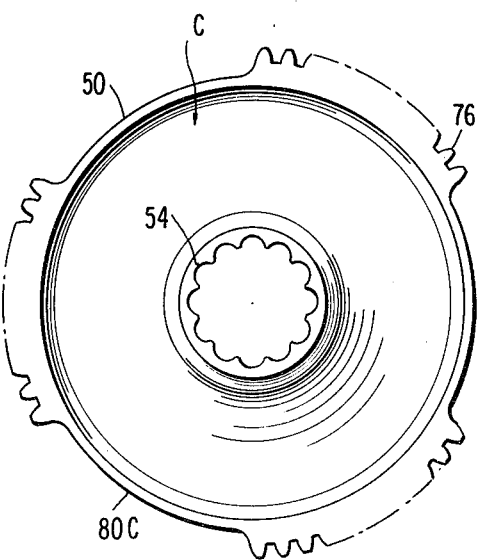

From FIGS. 5-7, it is apparent that the mutilated gears have teeth 76 in three different patterns of spacing, A, B, and C. Teeth 76 on the mutilated gears engage the teeth on pinion 24. Thus, if crank shaft 14 is de-clutched from driving shaft 12 by moving it outwardly, the drive runs from pinion 18 to gear 38, shaft 40, and via a selected one of the mutilated gears 46, 48, or 50, and pinion 24 to shaft 12. This "go" drive occurs so long as the teeth 76 of a mutilated gear mesh with the teeth of pinion 24. However, during the time when a land 80A, 80B, or 80C is passing pinion 24, no drive occurs. Thus, different "stop" and "go" drive sequences are obtained by moving plunger 52 inwardly or outwardly.

In normal operation, the fisherman swings the bail 7 outwardly so as to free the line and he casts out in normal fashion. By pulling crank shaft outwardly and operating finger piece 36 so as to engage latch 30 in groove 28, the drive is through the train incorporating the selected one of the mutilated gears. By moving plunger 52 inwardly and outwardly, the fisherman can select different "stop" and "go" patterns as he retrieves the lure. When he feels a strike, he swings finger piece 36 so as to permit spring 26 to force crank shaft to the left and thus engage clutch faces 20 and 22, whereupon the gearing is shifted to direct drive condition so he can set the hook and reel in the fish.

Although three selectively engageable mutilated gears are used in the illustrated form of the invention, more or less could be used if it were desired. Also, for purposes of simplicity and economy, a simple mutilated gear could be used if it were desired to forego the advantages of a gear-shifting mechanism of the type shown.

In the following claims, the term "gear" is used in its broad sense, to include wheels, rollers, and other motion-transmitting mechanisms.

I claim:

1. A fishing reel having
a reel drive shaft for a line-reeling mechanism,
a manually operable crank having a crank shaft,
a first drive means between said crank shaft and said reel drive shaft comprising cooperating clutch elements on said crank shaft and said reel drive shaft,
means for operatively engaging and disengaging said clutch elements,
a second drive means between said crank shaft and said reel drive shaft comprising,
a driving pinion rotating with said crank shaft,
an intermediate gear meshing with said driving pinion,
a driven pinion rotating with said reel drive shaft, and
multilated gearing rotating with said intermediate gear and intermittently meshing with said driven pinion upon rotation of said mutilated gearing.

2. A fishing reel as claimed in claim 1, means for normally biasing said clutch elements into operating engagement, and manually operable latch means for releasably retaining said clutch elements disengaged.

3. A fishing reel having
a reel drive shaft for a line-reeling mechanism,
a manually operable crank having a crank shaft,
a first drive means between said crank shaft and said reel drive shaft comprising cooperating clutch elements on said crank shaft and said reel drive shaft,
means for operatively engaging and disengaging said clutch elements,
a second drive means between said crank shaft and said reel drive shaft comprising,
a driving pinion rotating with said crank shaft,
a third shaft, a driven gear fixed on said third shaft and meshing with said driving pinion,
a driven pinion rotating with said reel drive shaft,
a plurality of mutilated gears rotably mounted on said third shaft and intermittently meshing with said driven pinion upon rotation thereof, and
means for selectively coupling said mutilated gears to said third shaft for rotation therewith.

4. A fishing reel as claimed in claim 1,
said gearing comprising a plurality of mutilated gears, and
means for selectively coupling said mutilated gears to said intermediate gear whereby the selected one of the mutilated gears rotates with said intermediate gear and the non-selected ones of said mutilated gears are in idle relationship with said intermediate gear.

* * * * *